March 5, 1957 D. H. CUSHION 2,783,671
DRILL PRESS ATTACHMENT
Filed June 1, 1954
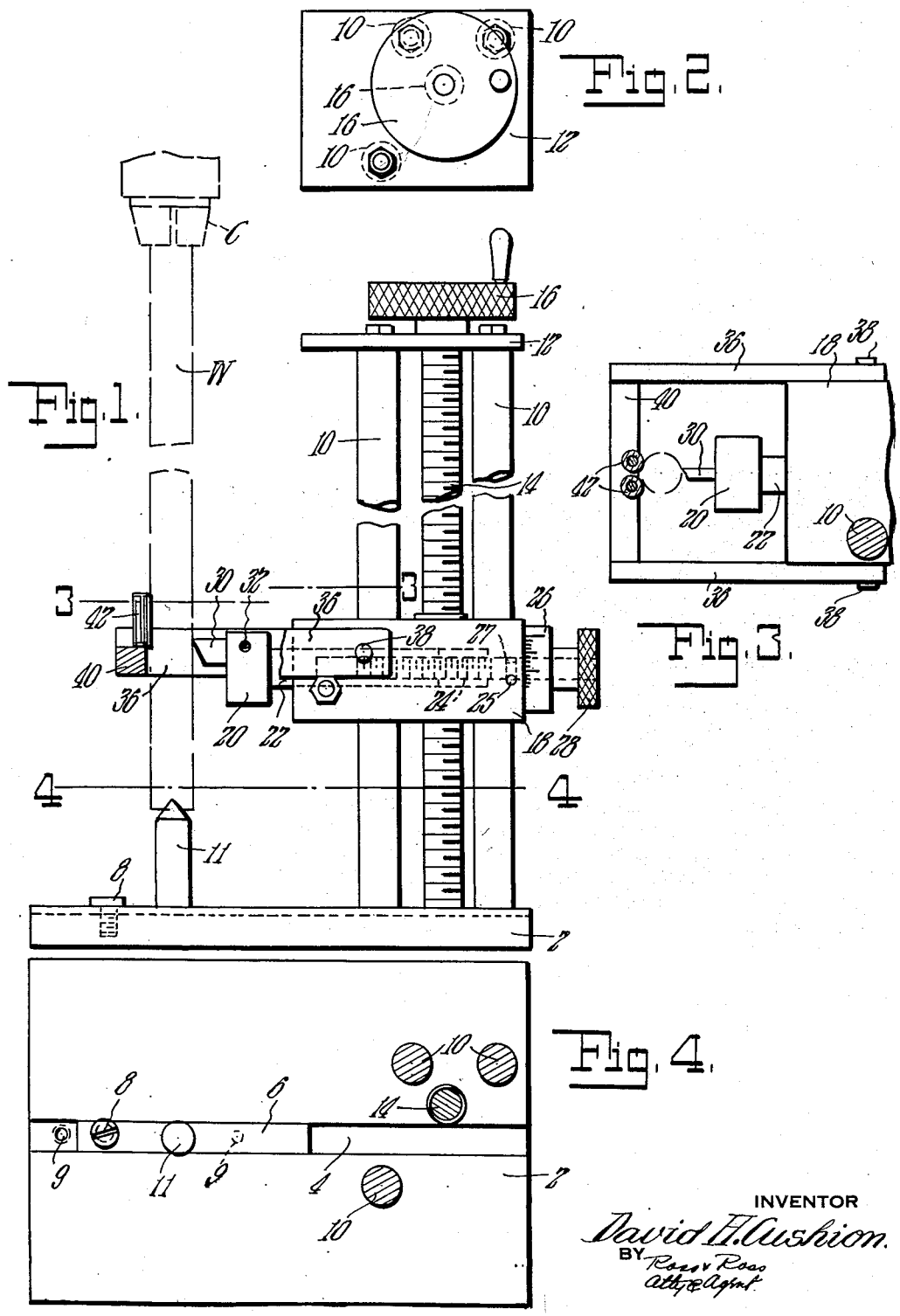
INVENTOR
David H. Cushion United States Patent Office 2,783,671
Patented Mar. 5, 1957

2,783,671
DRILL PRESS ATTACHMENT
David H. Cushion, Greenfield, Mass.

Application June 1, 1954, Serial No. 433,658

1 Claim. (Cl. 82—21)

This invention relates to improvements in machine tools and is directed more particularly to apparatus for turning work in connection with a drill press or the like.

The principal object of the invention is the provision of apparatus for use in connection with the bed or table of a drill press and the chuck thereof whereby a work piece may be rotated by the chuck or by means carried thereby and turned or shaped during rotation.

According to the invention, the apparatus in a broad way includes a base for securement to the table or bed of a drill press and tool carrying means is vertically reciprocable relative thereto. The construction is such that a tool may traverse a work piece while it is being rotated and guide means is provided for steadying the work.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Fig. 1 is a side elevational view of a machine tool embodying the novel features of the invention;

Fig. 2 is a plan view of the upper part of the machine shown in Fig. 1; and

Figs. 3 and 4 are sectional plan views in the lines 3—3 and 4—4 of Fig. 1.

Referring now to the drawings more in detail, the invention will be fully described.

A base 2 is provided which may be of any dimensions desired and adapted for securement to the bed or table of a drill press. Said base 2 is provided with an elongated groove 4 in which a slide 6 is adjustable by means of a screw 8 which may engage one of a plurality of tapped holes 9.

A live center 11 is carried by the slide for rotatably supporting the lower end of a work piece shown by the dash lines W. The upper end of the work piece may be engaged in and rotated by a chuck C or by means carried by the chuck which will be that of the drill press.

Guide rods 10 have lower ends secured to the base 2 and extend vertically upwardly therefrom. Upper ends of said rods are secured in some suitable manner to a cap plate 12.

A feed screw 14 is freely rotatable in the base 2 and plate 12 and carries a wheel 16 on its upper end adapted for manual engagement for rotation of said screw.

A carriage 18 is reciprocable on the rods 10 and is in threaded engagement with the feed screw 14. As the feed screw 14 is rotated in one direction or the other, the carriage 18 is moved up or down relative to the work associated with the chuck and live center.

A tool carrier 20 has a shank 22 which is reciprocable in the carriage 18. Said shank is internally threaded and a screw 24 is in threaded engagement therewith. Said screw 24 is provided on its outer end with an index wheel 26 and with a manually engageable member 28 for rotating the screw.

The tool carrier 20 may carry any form of tool desired, that represented by 30 being for purposes of disclosure only. The tool 30 may be clamped in the holder by a binding screw 32 or other suitable means whereby it may be held in adjusted position.

The tool carrier 20 may be adjusted towards the work piece for the desired action of the tool on the rotating work piece and the carriage may be moved up or down to move the tool longitudinally of the work piece in the desired manner.

The screw 24 is held against longitudinal movement by a pin 25 of the carriage in a groove 27 of the screw. This holds the screw and tool carrier against longitudinal unwanted movement thereby to obtain accuracy in turning of the work piece.

Steadying means is provided which consists of arms 36 pivoted at 38 to the carriage and a transverse bar 40 fixed to the outer ends of said arms. Rather closely spaced rolls 42 are rotatable on the bar 40 for bearing against the outer side of and steadying the work piece.

Thus it will be seen that the rolls 42 back up the pressure of the tool whereby the work piece is rotated on a true longitudinal axis at all times.

From the foregoing, it will be observed that the novel apparatus is such as to make a new and novel use of a drill press for results not heretofore obtainable and while the apparatus may be used for wood, it may be used for various other materials as well.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

Apparatus for rotatably supporting one end of a vertically disposed elongated work piece and machining said work piece as its opposite end is being rotated comprising in combination, a horizontal base, elongated guide rods having lower ends secured to said base and extending vertically upwardly therefrom, a cap secured to upper ends of said rods, an elongated threaded feed screw journalled for rotation at lower and upper ends in said base and cap, manually engageable operating means carried by said screw adjacent said cap for rotating the screw, a carriage slidably guided on said rods for up and down movements relative to said base and being in threaded engagement with said feed screw, a holder for a tool disposed forwardly of said carriage having a rearwardly extending shank slidable in said carriage on a horizontal axis, an adjusting screw rotatable in a rear portion of said carriage operatively engaging said shank for sliding said shank and holder back and forth relative to said carriage, said base provided with an elongated groove parallel to the axis of said adjusting screw, an elongated slide movable horizontally back and forth in said groove below said carriage having a center extending upwardly vertically from a forward end portion thereof and forwardly of said carriage for rotatably supporting the lower end of a vertically extending work piece having its upper end engaged for rotation, means for securing said slide in positions of longitudinal adjustment in said groove, relatively spaced side arms pivoted at inner ends to opposite sides of said carriage for swinging on a horizontal axis between rear non-steadying and forward horizontal steadying positions, a transverse member secured to outer ends of said arms and arranged to be disposed in the horizontal steadying position of said side arms forwardly of said carriage and outside a work piece vertically disposed on said center between said member and tool holder, and relatively spaced steady rolls rotatable on said member on vertical axes in steadying position of said arms to engage the outer side of a work piece on said center.

References Cited in the file of this patent

UNITED STATES PATENTS

| Number | Name | Date |
|---|---|---|
| 26,988 | Hendrick | Jan. 31, 1860 |
| 53,374 | Hatch | Mar. 20, 1866 |
| 605,504 | Muncaster | June 14, 1898 |
| 1,517,175 | Scott | Nov. 25, 1924 |
| 1,666,484 | Bouillon | Apr. 17, 1928 |
| 1,937,400 | Bickel | Nov. 28, 1933 |
| 2,114,926 | Kneff | Apr. 19, 1938 |
| 2,464,813 | Karge | Mar. 22, 1949 |
| 2,641,150 | Harry | June 9, 1953 |

FOREIGN PATENTS

| Number | Country | Date |
|---|---|---|
| 420,099 | Italy | Apr. 16, 1947 |